United States Patent
Farmer et al.

(10) Patent No.: US 8,279,911 B2
(45) Date of Patent: Oct. 2, 2012

(54) SYSTEMS, COMPUTER PROGRAM PRODUCTS, AND METHODS USING CARRIER PHASES TO DETECT MULTIPATH SIGNALS

(75) Inventors: Dominic Gerard Farmer, Los Gatos, CA (US); Jie Wu, San Diego, CA (US); Emilija M. Simic, La Jolla, CA (US)

(73) Assignee: QUALCOMM Incorporated, San Diego, CA (US)

(*) Notice: Subject to any disclaimer, the term of this patent is extended or adjusted under 35 U.S.C. 154(b) by 788 days.

(21) Appl. No.: 12/410,328

(22) Filed: Mar. 24, 2009

(65) Prior Publication Data

US 2010/0246644 A1 Sep. 30, 2010

(51) Int. Cl.
*H04B 1/707* (2011.01)
*H04L 27/38* (2006.01)

(52) U.S. Cl. ........................ 375/150; 375/316
(58) Field of Classification Search .......... 375/130, 375/136, 147, 150, 316, 324, 326, 340, 343; 342/357.22, 357.39, 357.61, 357.63, 357.67
See application file for complete search history.

(56) References Cited

U.S. PATENT DOCUMENTS

| | | | | |
|---|---|---|---|---|
| 5,402,450 | A * | 3/1995 | Lennen ................... | 375/343 |
| 6,272,189 | B1 * | 8/2001 | Garin et al. ............. | 375/343 |
| 6,347,113 | B1 * | 2/2002 | Hatch ...................... | 375/149 |
| 6,493,378 | B1 * | 12/2002 | Zhodzishsky et al. ... | 375/149 |
| 6,603,803 | B1 * | 8/2003 | Hatch ...................... | 375/150 |
| 6,868,110 | B2 * | 3/2005 | Phelts et al. ............ | 375/144 |
| 7,693,241 | B2 | 4/2010 | Shesha et al. | |
| 7,916,771 | B2 * | 3/2011 | Julien et al. ............ | 375/145 |
| 2003/0036390 | A1 * | 2/2003 | Villier et al. ............ | 455/456 |
| 2007/0203643 | A1 * | 8/2007 | Ramaswamy et al. ... | 701/211 |
| 2008/0130606 | A1 * | 6/2008 | Chang et al. ........... | 370/342 |
| 2010/0211316 | A1 * | 8/2010 | Da Silva et al. ........ | 701/216 |

FOREIGN PATENT DOCUMENTS

EP 1280282 1/2003

OTHER PUBLICATIONS

Gaudenzi, Direct-Sequence Spread-Spectrum Chip Tracking in the Presence of Unresolvable Multipath Components, Sep. 1999, IEEE Transactions on Vehicular Technology, vol. 48, No. 5, pp. 1573-1583.*
Hasson et al., A Novel Selective Combining Demodulator for Unresolvable Multipath in DS-Sp-Sp, May 9, 2001, Vehicular Technology Conference, 2001. VTC 2001 Spring. IEEE VTS 53rd, vol. 2, pp. 1197-1201.*
International Search Report and Written Opinion—PCT/US2010/028520, International Search Authority—European Patent Office—Sep. 6, 2010.

* cited by examiner

*Primary Examiner* — Lawrence B Williams
(74) *Attorney, Agent, or Firm* — Thien T. Nguyen

(57) ABSTRACT

A multipath detector includes an RF module receiving multiple signals, and a correlator module receiving the signals from the RF module. The correlator module correlates the signals to create a composite ACF, and produces samples of the composite autocorrelation function (ACF). The samples are time delayed relative to each other. The multipath detector also includes a carrier phase processor that receives the samples and estimates carrier phases associated with each of the samples. The carrier phase processor employs the estimated carrier phases to determine if one of the signals is subject to a multipath delay.

30 Claims, 9 Drawing Sheets

US 8,279,911 B2

SYSTEMS, COMPUTER PROGRAM PRODUCTS, AND METHODS USING CARRIER PHASES TO DETECT MULTIPATH SIGNALS

TECHNICAL FIELD

The present description relates, in general, to detecting the presence of multipath signals and, more specifically, to detecting the presence of multipath signals using carrier phase observables.

BACKGROUND

Code Division Multiple Access (CDMA) is a channel access technique that has found use in a variety of different applications. For example, some cellular phone services in the United States and elsewhere employ CDMA as a way to provide voice and data service for many customers at the same time in the same cell. In short, CDMA provides a way for multiple users to be multiplexed over the same physical channel.

CDMA has also found use in Satellite Positioning Systems (SPSs), such as the Global Positioning System (GPS). A particular CDMA technique is employed in SPSs, such as GPS, to allow the different positioning satellites to use the same two operating frequencies.

FIG. 1 is an illustration of a conventional autocorrelator 100 and a demodulator 150 for use in a CDMA receiver (not shown). The autocorrelator 100 includes a correlator module 101, a delay module 102, and a reference PRN module 103. A signal transmitted according to a CDMA technique is modulated with a pseudorandom (PRN) code. A receiver includes an autocorrelator, such as the autocorrelator 100, to pick a desired signal from a multitude of other signals using the PRN code of the desired signal. If a received signal matches the expected code of the desired signal, then the autocorrelation function (ACF) output by the correlator module 101 is high, and the system can use the signal. The autocorrelator 100 produces samples of ACFs, which it sends to a demodulator 150.

In addition to correlating signals based on codes, the autocorrelator 100 also correlates signals based on time. FIG. 2 is an illustration of an autocorrelation function (ACF) that represents an aspect of possible output of the autocorrelator 100. The x-axis of FIG. 2 is tau, which is a time delay relative to a carrier signal, and the y-axis is power. Tau can be applied by the delay module 102 of FIG. 1 during correlation. Specifically, the autocorrelator 100 can adjust a time delay, using the time delay module 102, when receiving a signal to discern a particular time delay where the received signal has its highest power. That particular delay can then be defined as tau equals zero in some systems. The signal shown in FIG. 2 is an autocorrelation function (ACF) of a well-defined signal that has an identifiable peak at tau equals zero.

FIG. 3 is another illustration of an autocorrelation function (ACF) that represents an aspect of a possible output of the autocorrelator 100. The ACFs 301 and 302 in FIG. 3 result from the correlation of a primary signal and a delayed signal, respectively. The ACFs 301 and 302 seen in FIG. 3 are often associated with a multipath phenomenon, where a transmitted signal reaches a receiver by more than one path (e.g., a line-of-sight path and a path due to reflection by a building). FIG. 3 is illustrative of a scenario wherein the time delay between the primary signal and delayed signal is large enough that the autocorrelator 100 can distinguish between the two signals. For CDMA-based SPS systems, delays of about two chips or more are usually resolvable. (In GPS systems one second equals 1.023 million chips.) In some CDMA systems, a rake receiver is used to combine distinguishable multipath signals in order to achieve a larger signal to noise ratio.

FIG. 4 is an illustration of an autocorrelation function (ACF) that represents an aspect of another possible output of the autocorrelator 100. FIG. 4 shows an ACF 400 that is a composite of two ACFS 401 and 402 from an indistinguishable multipath scenario. When contrasted with the ACF of FIG. 2, the ACF 400 has a larger width on the x-axis (i.e., is fatter) and has a rounded power peak around tau equals zero rather than the sawtooth-type shape of the ACF of FIG. 2, which shows a well-defined power peak centered at tau equals zero. The rounded shape is a consequence of the autocorrelator 100 failing to distinguish between a primary signal and a delayed signal, where the delay of the delayed signal relative to the primary signal is small. While shown as a bell-shape type curve in FIG. 4, ACFs resulting from indistinguishable multipath signals are not limited to such a shape. Usually, ACFs resulting from indistinguishable multipath signals show a wider range of power on the x-axis and can be irregularly shaped in some circumstances, causing difficulty for an application that looks for peak power.

For typical CDMA-based SPS systems, delays of about one chip or less are often indistinguishable. Indistinguishable multipaths are often undesirable because they cause a degradation of the information that can be gleaned from the signals. For instance, GPS systems typically identify peaks from ACFs to judge time of arrival of a signal from a Space Vehicle (SV). The fatness of an ACF with an indistinguishable multipath signal can lead to errors in judging signal time of arrival. In GPS, for example, a one-tenth of a microsecond time delay in a signal translates to about thirty meters so that accurate time estimation is usually important.

Currently, there is a need for detecting unresolvable multipaths quickly and efficiently from the output of the autocorrelator 100.

BRIEF SUMMARY

Various features of the invention are directed to systems and methods that detect unresolvable multipaths using carrier phase observables from correlated signals. In one example, a receiver has a carrier phase processor that receives samples of a composite ACF output from an autocorrelator. The carrier phase processor employs a carrier phase detector to produce data indicative of the carrier phases associated with the individual samples. For a given composite ACF, the example carrier phase detector produces carrier phase data (i.e., carrier phase observables) for each sample. The carrier phase processor further employs a carrier phase comparison module that compares a given sample's carrier phase observable to at least one other carrier phase observable for another sample. The carrier phase processor produces the carrier phase observables and comparisons as ACF samples are produced from signals received from a given transmitter (e.g., a space vehicle). The carrier phase processor can determine Doppler values associated with the received signals.

Over a period of time, phase differences are observed for a number of sets of samples from the transmitter. If the absolute values of the phase differences are consistently above a threshold, they can be relied upon as an accurate indicator of an unresolvable multipath for the transmitter. When a transmitter is identified by a receiver as having an unresolvable multipath, the receiver can take specific action directed at making the receiver's calculations more accurate. For example, the receiver can apply less weight to the signal in its processing. Additionally or alternatively, the receiver can omit the signal from its calculations. Still further, the receiver may employ alternate filtering/processing algorithms or take no action at all when appropriate.

Various features of the invention provide advantages. For instance, some aspects can identify unresolvable multipaths very reliably and efficiently. Furthermore, various aspects can be implemented in a device such as a cellular handset or a SPS receiver by use of a firmware or software update so that no new hardware is required.

The foregoing has outlined rather broadly the features and technical advantages of the present invention in order that the detailed description that follows may be better understood. Additional features and advantages will be described hereinafter which form the subject of the claims of the invention. It should be appreciated by those skilled in the art that the conception and specific aspects disclosed may be readily utilized as a basis for modifying or designing other structures for carrying out the same purposes of the present invention. It should also be realized by those skilled in the art that such equivalent constructions do not depart from the technology of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following description taken in conjunction with the accompanying drawings.

DETAILED DESCRIPTION

As used herein, a mobile station (MS) refers to a device such as a cellular or other wireless communication device, personal communication system (PCS) device, personal navigation device, Personal Information Manager (PIM), Personal Digital Assistant (PDA), laptop or other suitable mobile device which is capable of receiving wireless communications. The term "mobile station" is also intended to include Personal Navigation Devices (PNDs) as well as devices which communicate with PNDs, such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station."

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

Figure 6:
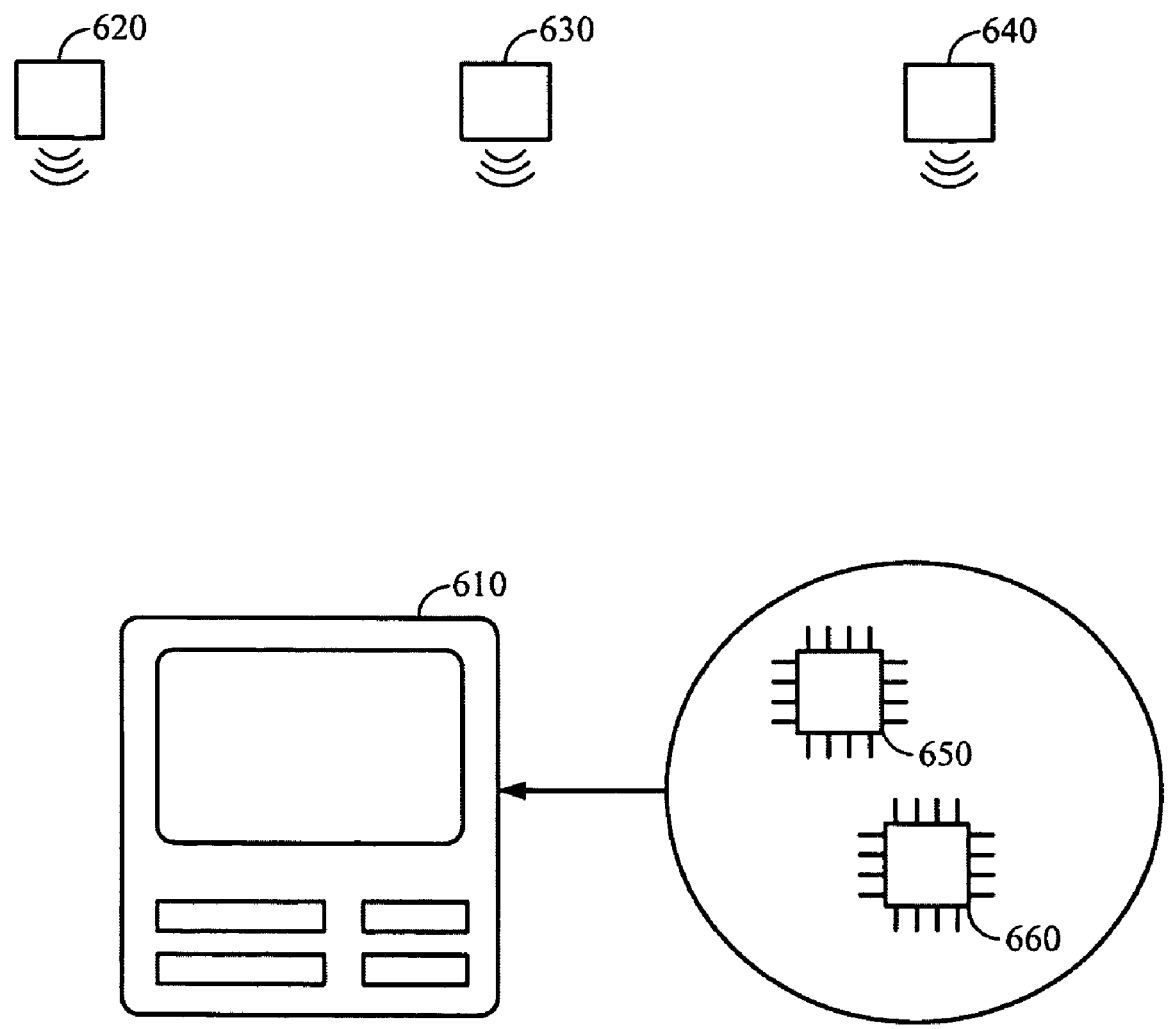
FIG. 6 is a block diagram showing an exemplary SPS system with an exemplary mobile station in which an aspect of the invention may be advantageously employed.

FIG. 6 is a block diagram showing an exemplary SPS system with an exemplary MS 610 in which an aspect of the invention may be advantageously employed. The MS 610 may receive signals from SVs 620, 630, and 640, which may be from a Global Positioning System (GPS), Galileo, GLONASS, NAVSTAR, GNSS, pseudolites, a system that uses satellites from a combination of these systems, or any other current SPS or any SPS developed in the future, each referred to generally herein as a Satellite Positioning System (SPS). A Satellite Positioning System (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The MS 610 includes a microprocessor 650 and a memory 660. The memory 660 is a tangible computer-readable medium that stores data and instructions that can be accessed or executed by a processing unit such as the processor 650. The microprocessor 650 and memory 660 are for example only, as other examples include memory integrated within a microprocessor, multiple microprocessors, multiple memory devices, etc. Although FIG. 6 illustrates a MS according to the teachings of the invention, the invention is not limited to these exemplary illustrated units. Aspects of the invention may be suitably employed in any device which includes a spread spectrum (e.g., CDMA) processing unit, such as a cellular telephone.

Figure 1:
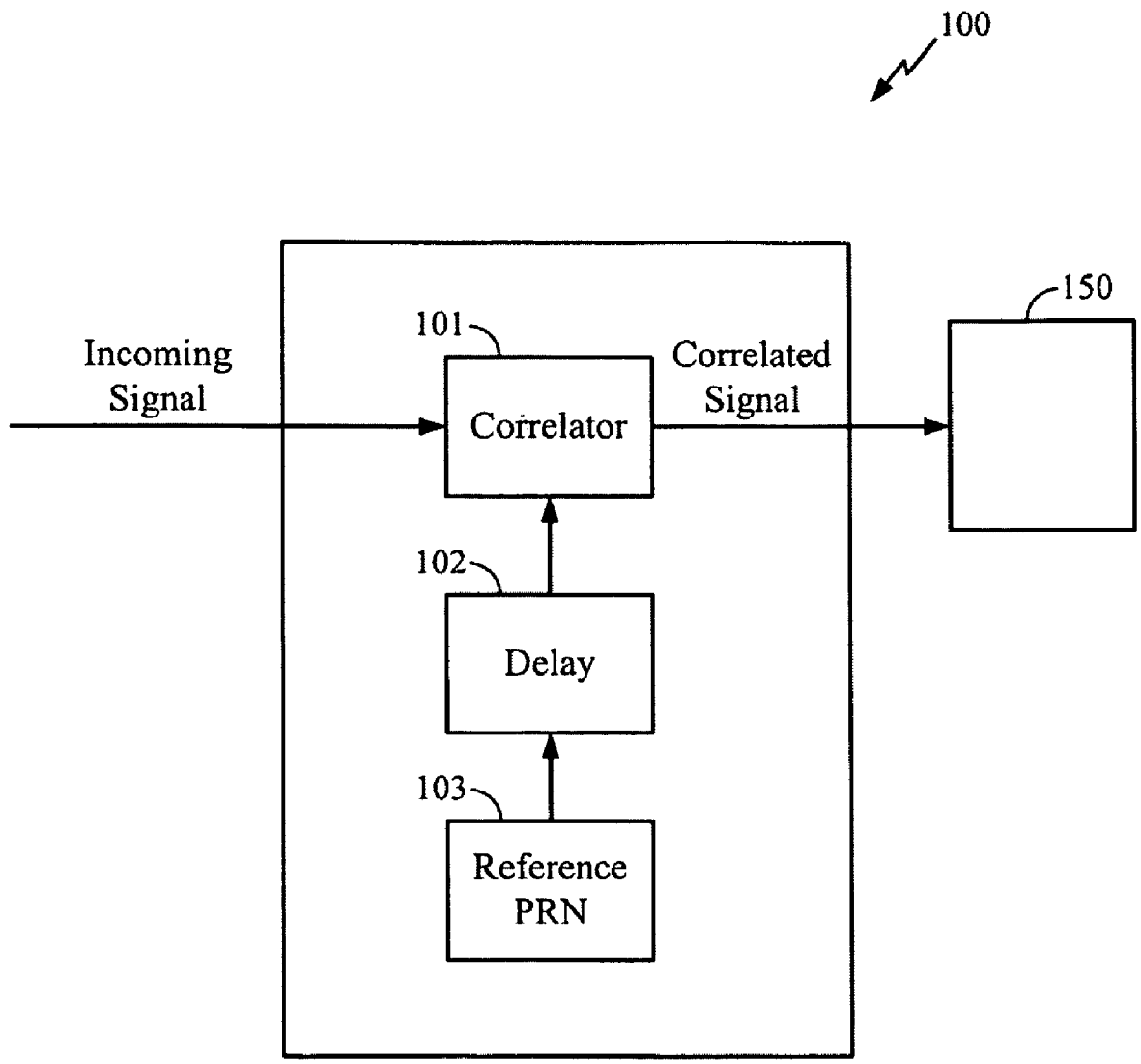
FIG. 1 is an illustration of a conventional autocorrelator for use in a CDMA receiver.
Figure 2:
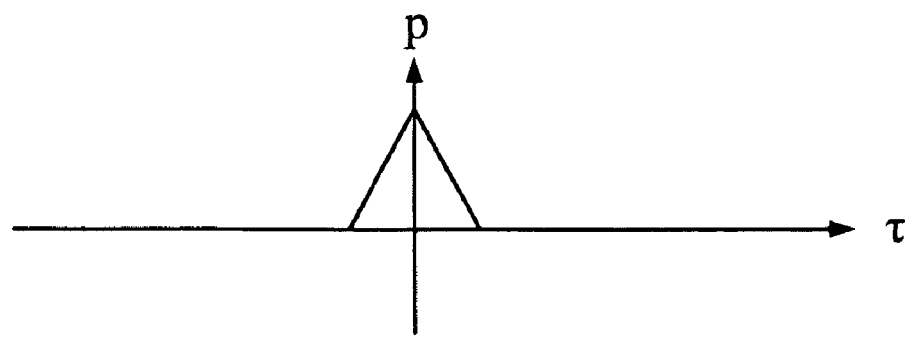
FIG. 2 is an illustration of an autocorrelation function (ACF) that represents an aspect of a possible output of an autocorrelator.
Figure 3:
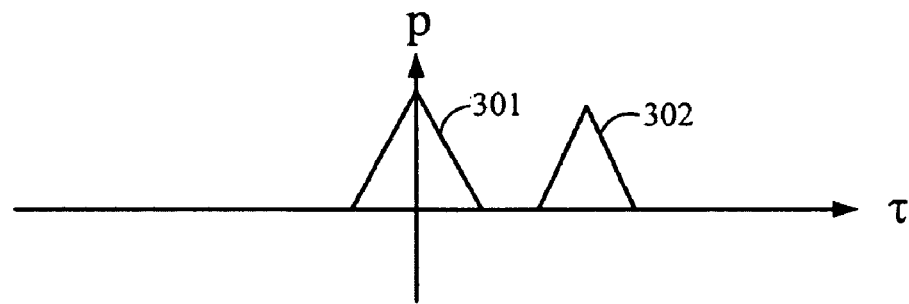
FIG. 3 is another illustration of an autocorrelation function (ACF) that represents an aspect of a possible output of an autocorrelator.
Figure 4:
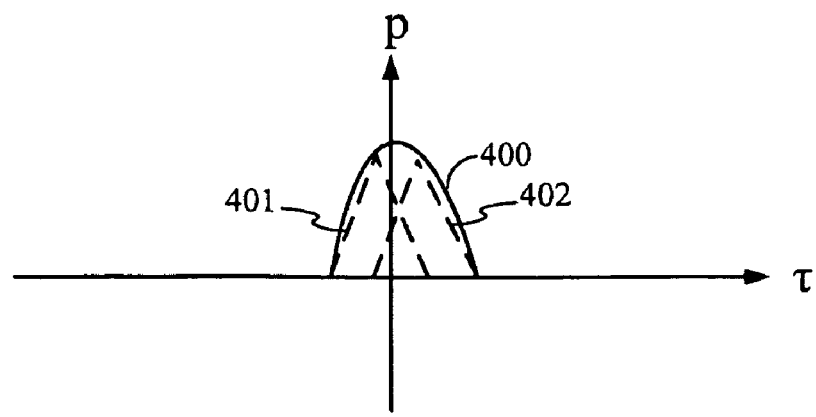
FIG. 4 is an illustration of an autocorrelation function (ACF) that represents an aspect of another possible output of an autocorrelator.
Figure 5:
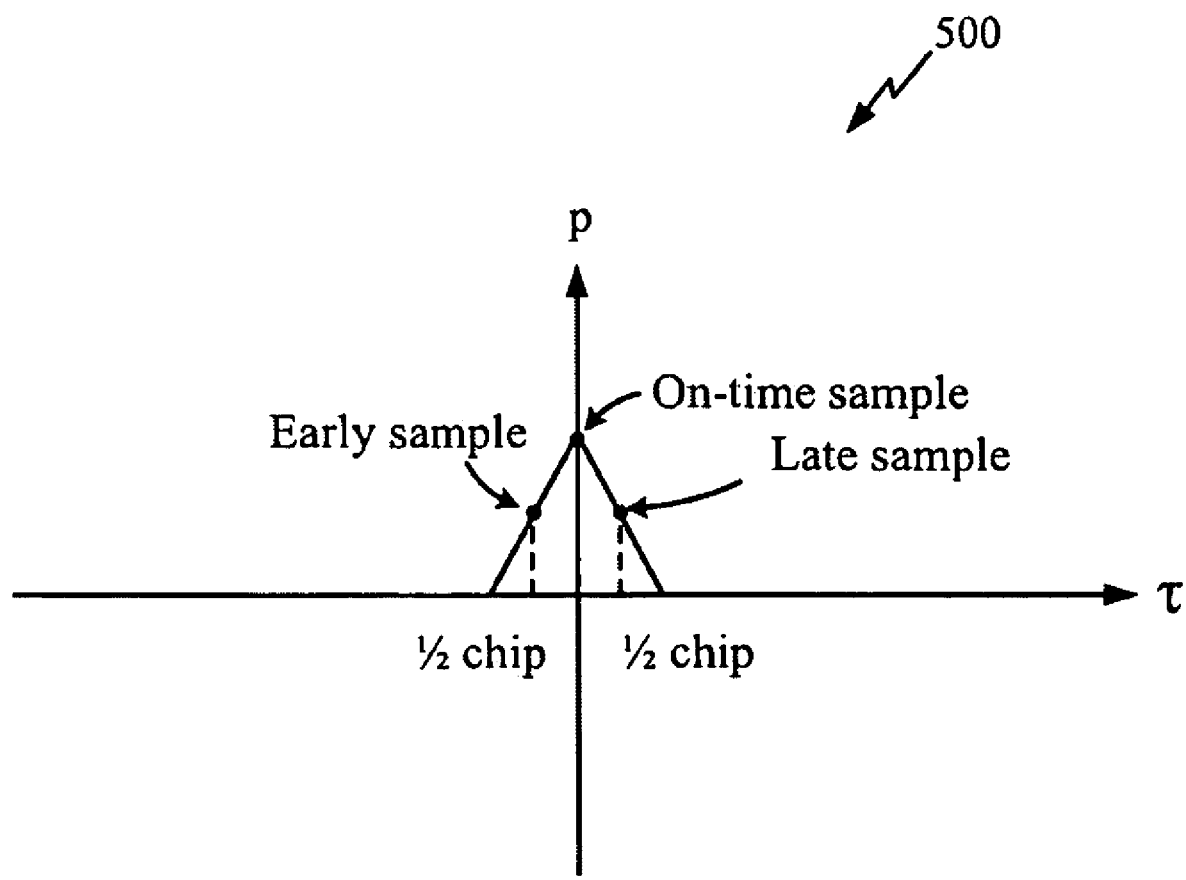
FIG. 5 is an illustration of samples taken of an ACF, where the ACF has been sampled at three time offsets.
Figure 7:
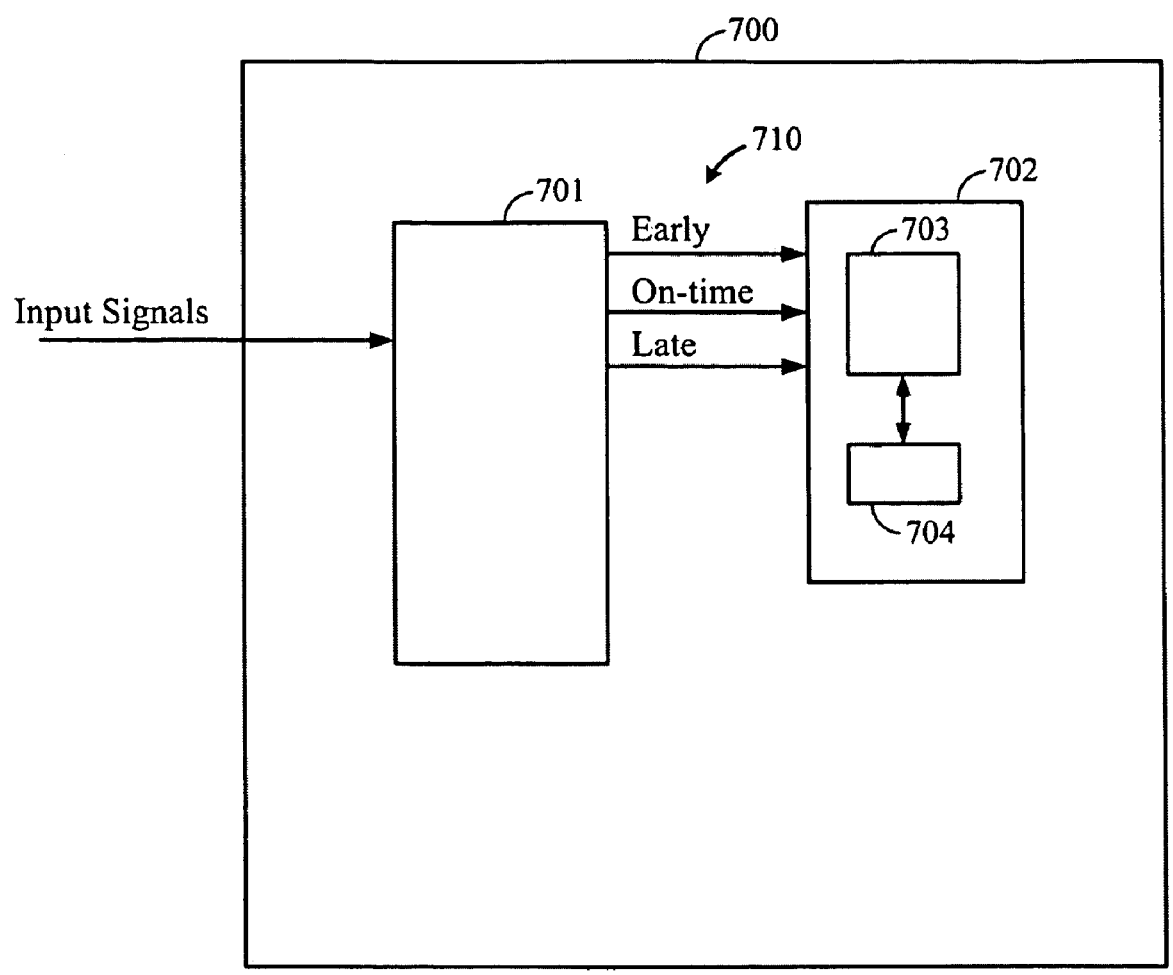
FIG. 7 is an illustration of an exemplary device adapted according to one aspect of the invention.

FIG. 7 is an illustration of an exemplary device 700 adapted according to one aspect of the invention. The device 700 can be, for example, an MS, such as a cellular phone, a GPS receiver, an in-vehicle navigation unit, and/or the like. The device 700 includes an autocorrelator 701, which receives signals and outputs samples 710 of the ACF to the demodulator 702. For example (as seen in FIG. 5) the ACF 500 can be sampled at three time offsets. The first sample is performed at tau of one-half chip early. The second sample is at tau equals zero, and the third sample is at tau of one-half chip late. For each ACF, the autocorrelator 701 passes three samples to the demodulator 702, thereby providing one early sample stream, one on-time sample stream, and one late sample stream to the demodulator 702. FIG. 7 shows the autocorrelator 701 providing three streams of samples to the demodulator 702; however, the scope of the invention is not so limited. Various aspects can include any number of sample streams, e.g., two, four, or even more. In one embodiment, an RF module, which receives signals, receives only a single signal and the multipath detector indicates the signal is not subject to multipath delay.

The autocorrelator 701 provides the sample streams to the demodulator 702 so the demodulator 702 receives successive sets of samples from a composite autocorrelation function (ACF). The samples are received by the carrier phase detector 703, which produces carrier phase observables for each of the received samples. The carrier phase observables are passed to the carrier phase processor 704, which makes comparisons among the carrier phase observables and identifies unresolvable multipaths.

Figure 8:
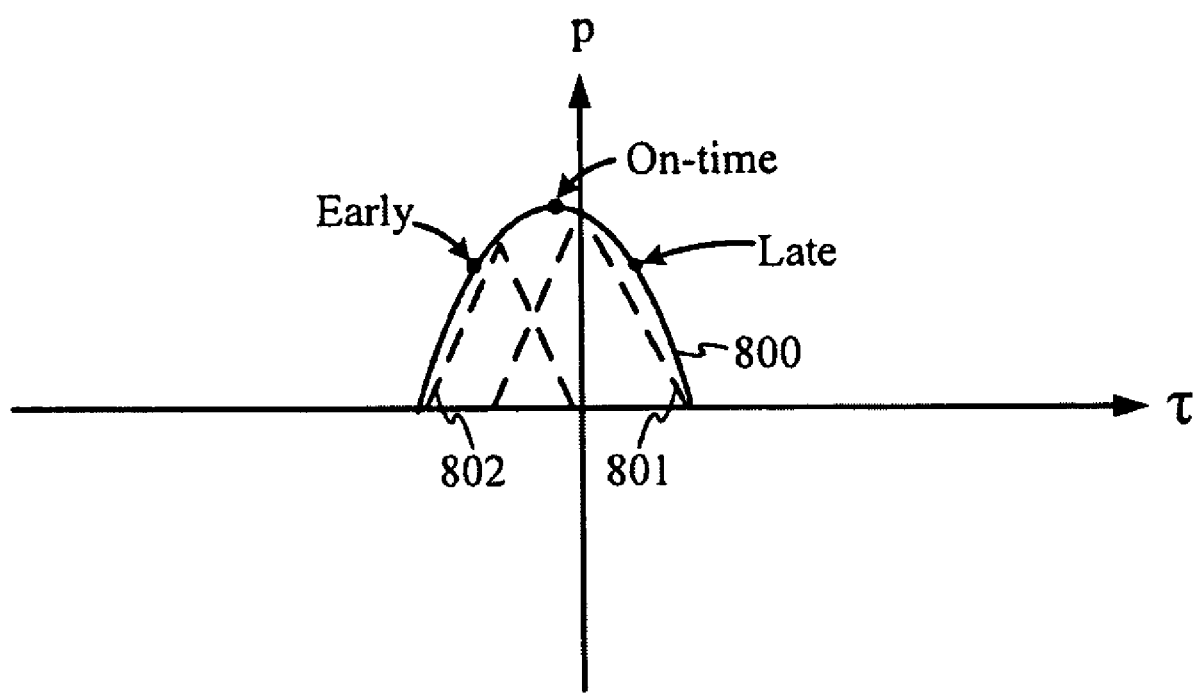
FIG. 8 is an illustration of an example ACF that has an unresolvable multipath that can be detected by a feature of the invention.

Turning attention to FIG. 8, an example a composite ACF 800 is shown that has an unresolvable multipath. As can be seen, the composite ACF 800 is a composite of the ACFs 801 and 802, where the ACF 802 is slightly earlier than ACF 801. The autocorrelator 701 outputs three samples—early, on-time, and late. The late and on-time samples are dominated by the energy from the ACF 801. By contrast, the early sample is dominated by energy from the ACF 802. Turning attention back to FIG. 7, the carrier phase detector 703 receives the samples and provides phase information for each sample. The phase information for the late sample and the on-time sample predominantly reflects the carrier phase of the signal that produces the ACF 801. The phase information for the early sample predominantly reflects the carrier phase of the signal that produces the ACF 802. In this case the signal that produces the ACF 802 is received along a different path than that of the signal that produces the ACF 801. As a result, the two signals have different carrier phases.

The carrier phase detector 703 detects the carrier phases of the samples, producing carrier phase observables that show a different phase for the early sample than for the late and on-time samples. In one embodiment, the signal is continually sampled, and the samples are fed to the carrier phase detector 703, which produces carrier phase observables for the streams of samples.

The carrier phase detector 703 sends the carrier phase observables to the carrier phase processor 704, which, among other things, processes the information in the carrier phase observables to identify unresolvable multipaths. In this example, the carrier phase processor 704 calculates, for each set of three samples, a difference between the phase in the late sample and the on-time sample and a difference between the phase in the early sample and the on-time sample. The phase differences are calculated and observed for a period of time (e.g., time for twenty, fifty, or one hundred sets of samples) in order to identify a trend in carrier phase differences. Typically, as the samples are analyzed by the carrier phase processor 704, each subsequent set of samples will show slightly different carrier phase differences than the previous set of samples, though the amount of the difference can be indicative of an unresolvable multipath.

Figure 9:
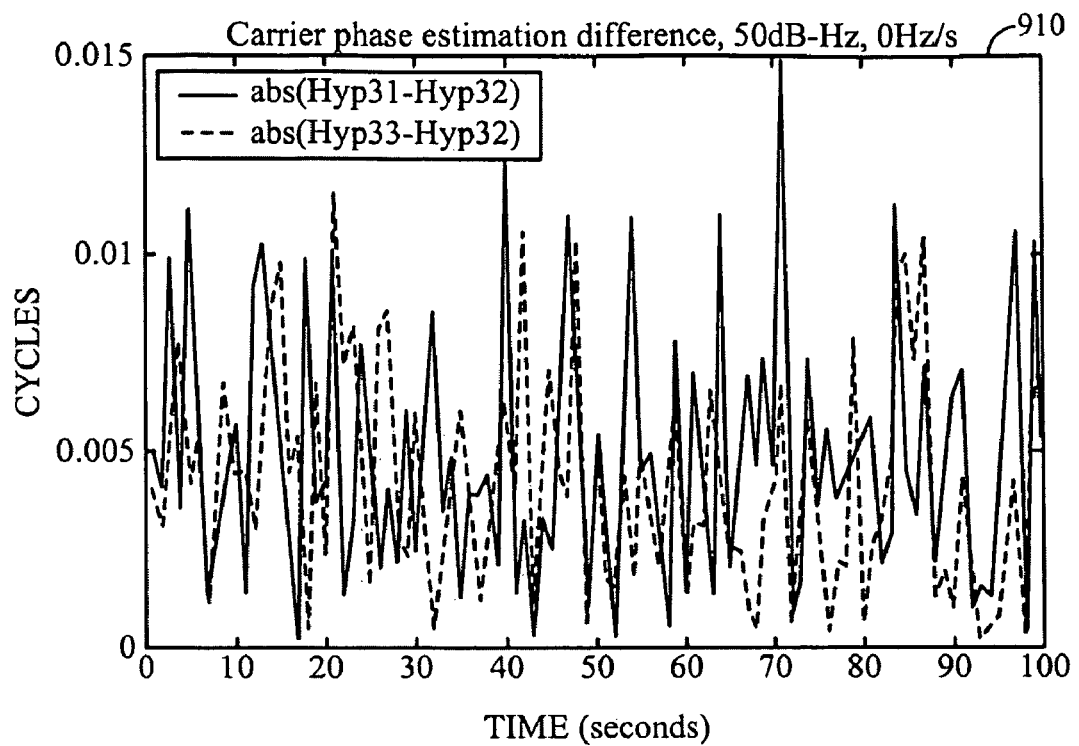
FIG. 9 includes two graphs of simulated carrier phase differences.
Figure 9:
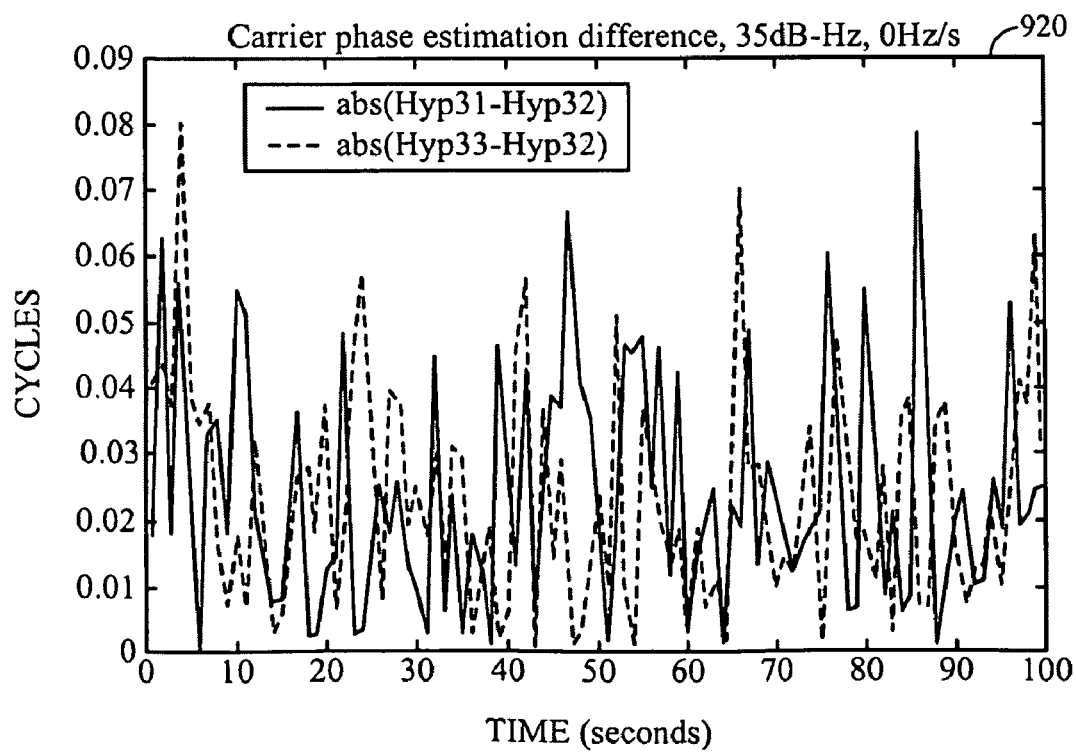

Attention is now directed to FIG. 9, which includes two graphs 910 and 920 of simulated carrier phase differences. Graphs 910 and 920 show that with an ACF of a signal from a single path (e.g., the ACF of FIG. 5), the carrier phase observables are quite consistent. At carrier to noise density ration ($C/N_o$)=50 dB-Hz, the carrier phase difference is within about 0.015 cycles over an extended period of time, as shown by graph 910. At $C/N_o$=35 dB-Hz, the carrier phase difference is within about 0.09 cycles over an extended period of time, as shown by graph 920.

Figure 10:
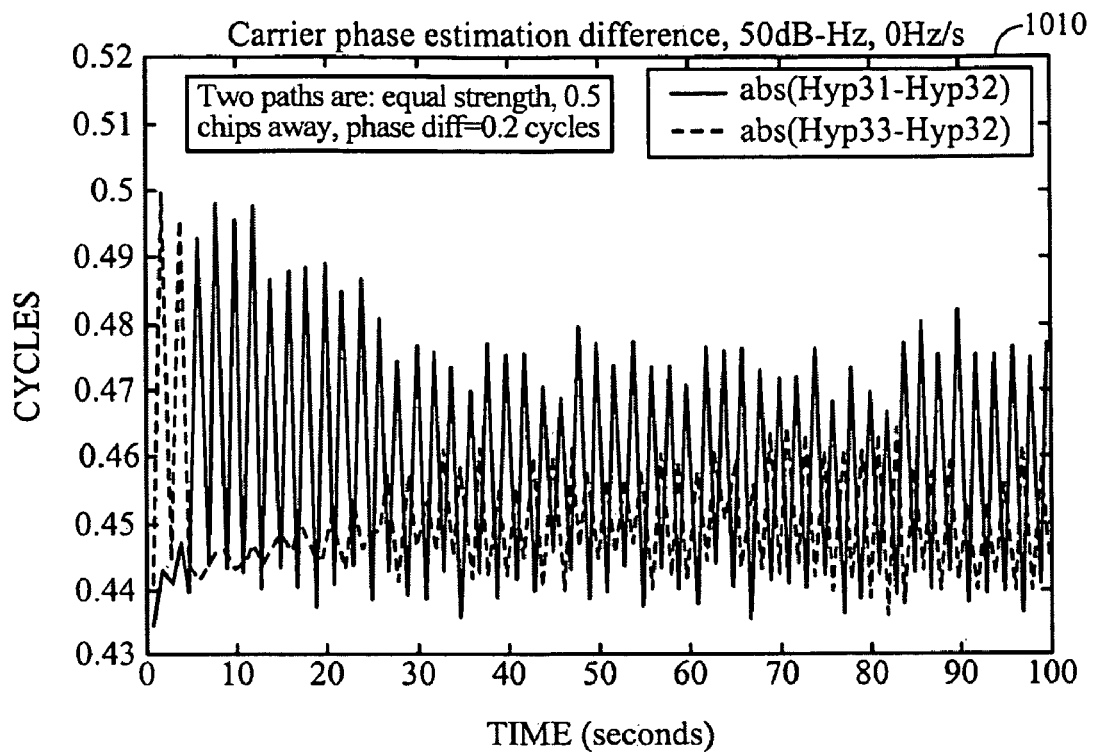
FIG. 10 includes two graphs of simulated carrier phase differences indicative of an unresolvable multipath that can be detected by a feature of the invention.
Figure 10:
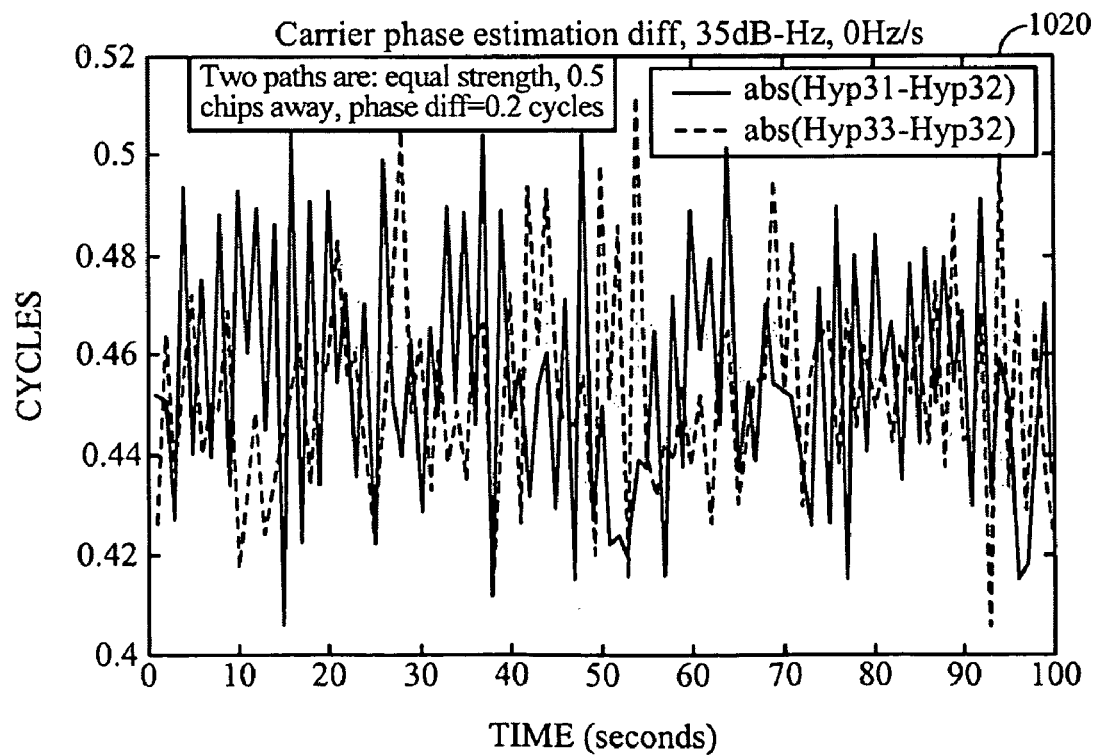

Attention is now directed to FIG. 10, which includes two graphs 1010 and 1020 of simulated carrier phase differences. Graphs 1010 and 1020 show that with an ACF of a signal that has an unresolvable multipath (e.g., similar to the ACF of FIG. 8), the carrier phase observables show an identifiable amount of inconsistency. Graphs 1010 and 1020 show that with an example two-path signal (paths separated by 0.5 chips), the carrier phase observables are quite inconsistent. At $C/N_o$=50 dB-Hz, the difference is as high as 0.5 cycles, as shown by graph 1010. At $C/N_o$=35 dB-Hz, the difference is as high as 0.51 cycles, as shown by graph 1020.

Returning to FIG. 7, the carrier phase processor 704 includes functionality to recognize the size of carrier phase differences and to identify unresolvable multipaths therefrom. In one example, the carrier phase processor 704 includes functionality to compare carrier phase differences observed over twenty sets of samples to a threshold of 0.09 cycles. If the average carrier phase difference over the twenty sets of samples exceeds 0.09 cycles, then the carrier phase processor 704 identifies the signal as containing an unresolvable multipath.

While a particular technique for calculating carrier phase differences has been described above, the invention is not so limited. For instance, some features may compare early samples to late samples, as well. Also, as the numbers of samples varies among techniques, techniques that take two samples in a set or more than three samples in a set can use techniques adapted for those numbers of samples. Furthermore, the scope of the invention is not limited to the particular techniques described above for identifying unresolvable multipaths from the carrier phase differences. For example, specific thresholds, specific times for observing carrier phase differences, and the like can vary among techniques and can even be varied during use of a system according to a single technique. Any statistical technique for identifying a pattern of carrier phase differences indicative of an unresolvable multipath can be used.

Furthermore, aspects of the invention can correlate signals from a number of different transmitters and perform analysis as described above for the signals for each of the transmitters. One example technique includes a GPS receiver that observes transmitted signals from six SVs. The signals from each of the SVs are received, correlated, and processed for identifying unresolvable multipaths. When a signal from an SV is identified as including an unresolvable-multipath, the GPS receiver can take any of a variety of actions. The GPS receiver can omit the signal from the particular SV, using the remaining signals from the other SVs to discern location. The GPS receiver can also change a weight given to the particular SV in position calculations, e.g., by applying less weight to the SV in order to reduce error from the SVs signal. The GPS receiver can also take no action, if appropriate. Any action taken in response to identifying an unresolvable multipath, or any decision not to take action, is within the scope of techniques. Furthermore, multipaths are generally known to change with time and with position, so that example techniques of the invention continually, periodically, or with changing conditions check for unresolvable multipaths.

In another embodiment, in response to identifying a larger number of multipath signals (or more frequent occurrence of multipath detection) (for example as a result of a change in environment such as entering a multipath rich environment) the GPS receiver can decide to use a different search and/or filtering algorithm or even enter a different receiver operational mode. Similarly, if a smaller number of multipath signals are detected over a period of time (for example as a result of a leaving a multipath rich environment) the GPS receiver can decide to use a different search and/or filtering algorithm, or even enter a different receiver operational mode.

The autocorrelator 701 and demodulator 702 can be implemented, e.g., using a chipset of one or more semiconductor microprocessors. In another example, the autocorrelator 701 and demodulator 702 are implemented using a general purpose processor, Application Specific Integrated Circuit (ASIC), Digital Signal Processor (DSP), and or the like. Furthermore, the architecture of the device 700 is not limited to that shown in FIG. 7. For example, the autocorrelator 701 and demodulator 702 can be implemented on the same or a different processor, and, in fact, the functionality provided by either or both of autocorrelator 701 and demodulator 702 can be on a same processor or spread amongst multiple processors. The logic to perform the operations of the autocorrelator 701 and demodulator 702 can be implemented using software, firmware and/or hardware.

Figure 11:
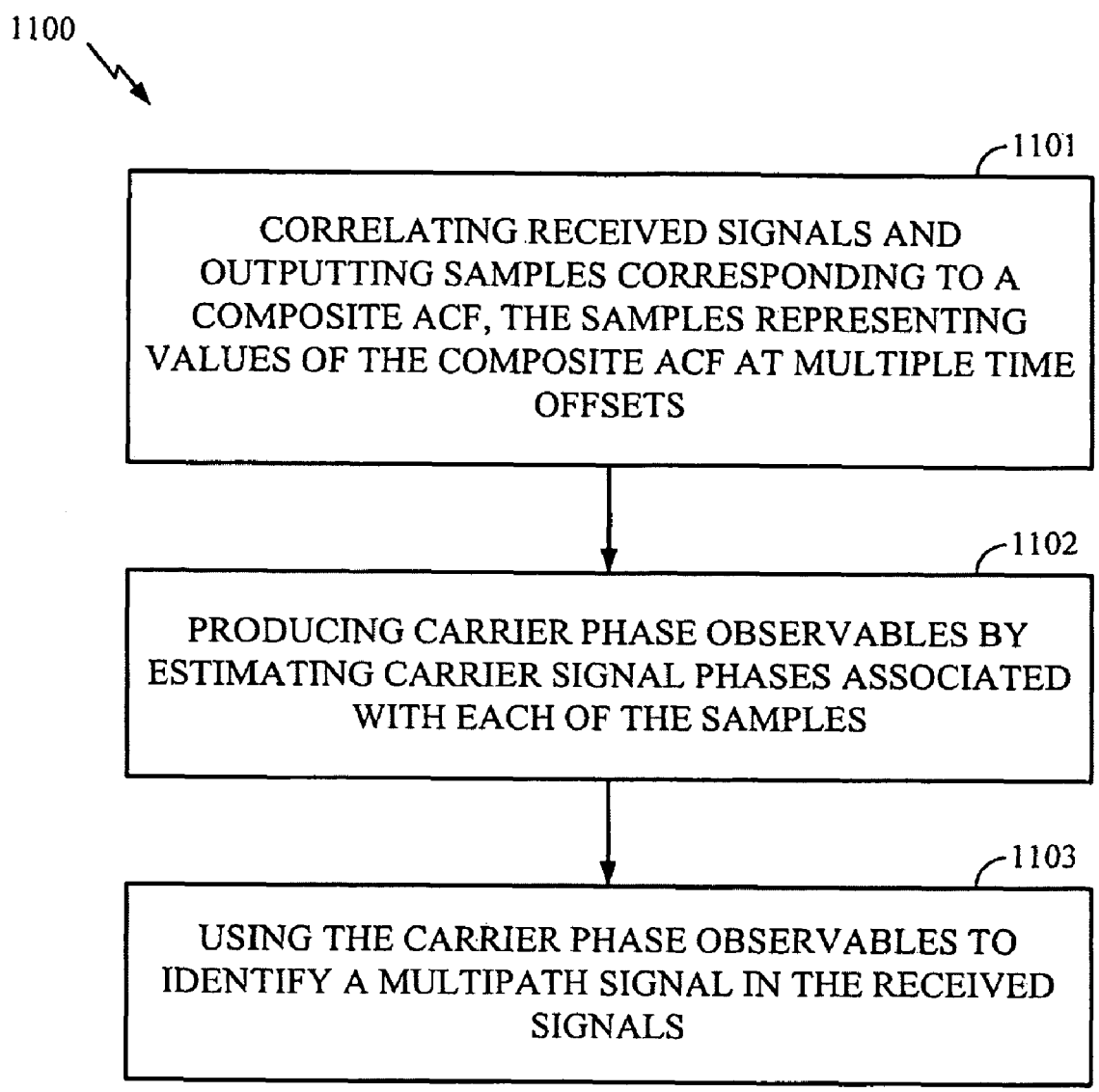
FIG. 11 is an illustration of an exemplary method adapted according to one aspect of the invention.

Some aspects include methods for identifying multipaths. Such example aspects can be performed, for example, by devices, such as those described above. FIG. 11 is an illustration of exemplary method 1100 adapted according to one aspect of the invention. In block 1101, received signals are correlated and sampled. In one example aspect, signals received from a transmitter are processed by a CDMA autocorrelator, which produces a composite ACF and samples the composite ACF. The samples represent values of the composite ACF at multiple time offsets. The samples of the composite ACF are output. Furthermore, many techniques provide for receiving, correlating, and sampling signals from other transmitters as well, such as in the context of a SPS, where signals from multiple SVs are used to discern position.

In block 1102, carrier phase observables are produced by estimating carrier signal phases associated with each of the samples. In one example technique, the carrier phase observables are data that indicate a carrier phase associated with a given sample.

In block 1103, the carrier phase observables are used to identify a multipath signal in the received signals. One example technique uses differences in carrier phase observables as an indication of the presence of an unresolvable multipath.

In another embodiment, multipath detection occurs for a moving receiver. For example, if a moving receiver has a space vehicle transmitting a signal from a 45 degree elevation directly behind the moving receiver and a building is ahead of the moving receiver, the moving receiver will receive both the direct line of sight signal and a signal reflected off the building. The Doppler value (i.e., phase change/time) will be positive for the reflected signal and negative for the direct signal. By analyzing a history of carrier phase observables, the Doppler values can be determined for each signal. Thus, the reflected signal can be identified.

While method 1100 has been shown as a series of discrete steps, various features are not so limited. Some features may add, omit, rearrange, or modify one or more steps. For instance, some features take actions in response to an identification of a multipath scenario, such as omitting some signals known to have multipaths from subsequent processing. Other features provide weighting to signals so that signals known to have multipaths can be weighted accordingly to reduce errors in a subsequent use of the signals.

Signals processed according to techniques of the invention can be used in various applications. For instance, identification of multipaths and subsequent deweighting or omission of signals can be used to provide enhanced reliability in SPS receivers. In one example, a GPS receiver uses a method according to an aspect to produce more accurate location information for a human user. The location information is provided to the human user, e.g., on a video screen and/or through audio speakers. In another example, a CDMA telephony handset uses a method according to an aspect to provide location information. For example, advanced forward link trilateration (AFLT) or observed time difference of arrival (OTDA) techniques would benefit from the disclosed multipath detection.

The methodologies described herein may be implemented by various means depending upon the application. For example, these methodologies may be implemented in hardware, firmware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory 660 of the MS 610, and executed by a processing unit, for example the microprocessor 650 of the MS 610 (see FIG. 6). Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Various features provide advantages to users of some applications. For instance, SPS applications can be made more accurate, as described above. Furthermore, various features can be implemented by changing firmware and/or software in existing applications, thereby providing efficient implementation.

Although specific circuitry has been set forth, it will be appreciated by those skilled in the art that not all of the disclosed circuitry is required to practice the invention. Moreover, certain well known circuits have riot been described, to maintain focus on the invention.

Although the present invention and its advantages have been described in detail, it should be understood that various changes, substitutions and alterations can be made herein without departing from the technology of the invention as defined by the appended claims. Moreover, the scope of the present application is not intended to be limited to the particular process, machine, manufacture, composition of matter, means, methods or steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding features described herein may be utilized according to the present invention. Accordingly, the appended claims are intended to include within their scope such processes, machines, manufacture, compositions of matter, means, methods, or steps.

What is claimed is:

1. A multipath detector comprising:
an RF module that receives a plurality of signals;
a correlator module that receives the signals from the RF module, correlates the signals to create a composite autocorrelation function (ACF), and produces a plurality of samples of the composite ACF, the samples being time delayed relative to each other; and
a carrier phase processor that receives the samples and estimates carrier phases associated with each of the samples, the carrier phase processor identifying whether one of the received signals is subject to a multipath delay based upon the estimated carrier phases.

2. The multipath detector of claim 1 wherein the signal subject to the multipath delay comprises an unresolvable multipath signal.

3. The multipath detector of claim 1 wherein the signal subject to the multipath delay is delayed with respect to a first signal by a time difference that causes the correlator to incorrectly distinguish the signal subject to the multipath delay from the first signal.

4. The multipath detector of claim 3 wherein the signal subject to the multipath delay is delayed with respect to a first signal by a time difference less than or equal to one and one-half chips.

5. The multipath detector of claim 1 wherein the correlator module comprises:
a Code Division Multiple Access (CDMA) autocorrelator.

6. The multipath detector of claim 2 wherein the multipath detector is employed in a Satellite Positioning System (SPS) receiver.

7. The multipath detector of claim 6 wherein the SPS receiver associates the unresolvable multipath signal with a first satellite, the SPS receiver omitting signals from the first satellite when discerning a location of the SPS receiver, the omitting performed in response to determining the unresolvable multipath signal.

8. The multipath detector of claim 6 wherein the SPS receiver associates the unresolvable multipath signal with a first satellite, the SPS receiver applying a weight to signals from the first satellite in response to determining the unresolvable multipath signal when discerning a location of the SPS receiver.

9. The multipath detector of claim 6 wherein the SPS receiver changes at least one algorithm based upon determining a change in a number of detected unresolvable multipath signals over a period of time.

10. The multipath detector of claim 1 wherein the carrier phase processor determines Doppler values associated with the received signals.

11. The multipath detector of claim 1 wherein the correlator module comprises:
a CDMA autocorrelator in a CDMA handset.

12. The multipath detector of claim 11 wherein the CDMA handset comprises a cellular telephone.

13. The multipath detector of claim 11 wherein the CDMA autocorrelator is integrated within a CDMA chipset.

14. The multipath detector of claim 1 wherein the plurality of samples of the composite ACF comprises:
early samples;
on-time samples; and
late samples.

15. The multipath detector of claim 14 wherein the carrier phase processor generates a difference between carrier phases of the early samples and the on-time samples, the carrier phase difference indicating an unresolvable multipath delay when an absolute value of the carrier phase difference is greater than a threshold.

16. The multipath detector of claim 14 wherein the carrier phase processor generates a difference between carrier phases of the late samples and the on-time samples, the carrier phase difference indicating an unresolvable multipath delay when an absolute value of the carrier phase difference is greater than a threshold.

17. A method for multipath detection comprising:
correlating a plurality of received signals and outputting samples corresponding to a composite autocorrelation function (ACF), the samples representing values of the composite ACF at a plurality of time offsets;
producing carrier phase observables by estimating carrier signal phases associated with each of the samples; and
using the carrier phase observables to identify a multipath signal in the received signals.

18. The method of claim 17 wherein correlating a plurality of received signals comprises:
matching each of the signals with a pseudorandom code at a plurality of different reference times and selecting a time delay corresponding to a reference time that produces a relatively large energy peak.

19. The method of claim 17 further comprising:
applying a weight to the identified multipath signal, the weight reducing an effect of the identified multipath signal when estimating a location of a Satellite Positioning System (SPS) receiver.

20. The method of claim 17 further comprising:
discerning a location of a Satellite Positioning System (SPS) receiver by estimating times of arrival of the received signals using a process that omits use of the identified multipath signal in the discerning.

21. The method of claim 17 wherein correlating a plurality of received signals comprises:
performing autocorrelation according to a Code Division Multiple Access (CDMA) technique.

22. The method of claim 17 wherein using the carrier phase observables to identify the multipath signal in the received signals comprises:
calculating carrier phase differences among at least a portion of the carrier phase observables;
comparing the calculated carrier phase differences to a threshold; and
based on the comparison to the threshold, identifying an unresolvable multipath.

23. A system comprising:
means for receiving a plurality of signals delayed relative to each other;
means for performing autocorrelation on the received signals and producing a plurality of samples of a composite autocorrelation function (ACF);
means for generating carrier phase information for the samples; and
means for identifying a multipath signal using the carrier phase information.

24. The system of claim 23 wherein the system comprises a Global Positioning System (GPS) mobile station.

25. The system of claim 23 wherein the system comprises a Code Division Multiple Access (CDMA) handset.

26. The system of claim 23 wherein the system comprises a chipset including one or more microprocessors.

27. A non-transitory computer readable medium encoded with instructions, when executed by a processing unit, implement multipath detection, the instructions comprising:
code that correlates received signals;
code that samples a composite autocorrelation function (ACF) based on the correlated signals;
code that generates carrier phase observables for the samples, each carrier phase observable indicating a carrier signal phase associated with its respective sample; and
code that detects a multipath signal based upon the carrier phase observables.

28. The computer readable medium of claim 27 wherein the code that detects a multipath signal comprises:
code that compares at least a first portion of the carrier phase observables against at least a second portion of the carrier phase observables to generate carrier phase differences;
code that compares the generated carrier phase differences against a threshold; and
code that indicates an unresolvable multipath in response to results of the comparing the generated carrier phase differences against the threshold.

29. The computer readable medium of claim 27 wherein the code that correlates received signals comprises:
code that produces an autocorrelation function according to a Code Division Multiple Access (CDMA) technique.

30. The computer readable medium of claim 27 further comprising:
code that discerns a location of a Satellite Positioning System (SPS) receiver; and
code that displays the discerned location upon a screen of the SPS receiver.

* * * * *